(12) United States Patent
Sreekumari et al.

(10) Patent No.: US 11,410,086 B2
(45) Date of Patent: Aug. 9, 2022

(54) SYSTEM AND METHOD FOR CLASS SPECIFIC DEEP LEARNING

(71) Applicant: General Electric Company, Schenectady, NY (US)

(72) Inventors: Arathi Sreekumari, Bangalore (IN); Radhika Madhavan, Banglaore (IN); Suresh Emmanuel Joel, Bangalore (IN); Hariharan Ravishankar, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 792 days.

(21) Appl. No.: 16/282,592

(22) Filed: Feb. 22, 2019

(65) Prior Publication Data

US 2019/0258962 A1    Aug. 22, 2019

(51) Int. Cl.
*G06N 20/20* (2019.01)
*G06N 20/10* (2019.01)
*G06N 3/04* (2006.01)

(52) U.S. Cl.
CPC ............. *G06N 20/20* (2019.01); *G06N 20/10* (2019.01); *G06N 3/0445* (2013.01); *G06N 3/0472* (2013.01)

(58) Field of Classification Search
CPC ........ G06N 20/00; G06N 20/10; G06N 20/20; G06N 3/02; G06N 3/04; G06N 3/0445; G06N 3/0454; G06N 3/049; G06N 3/0472

See application file for complete search history.

(56) References Cited

U.S. PATENT DOCUMENTS

| | | | |
|---|---|---|---|
| 2017/0103287 A1* | 4/2017 | Han | G06K 9/46 |
| 2017/0132230 A1* | 5/2017 | Muralidhar | G06F 16/9535 |
| 2017/0178308 A1* | 6/2017 | Subramaniyan | G06K 9/6214 |
| 2018/0293488 A1* | 10/2018 | Dang | G06N 3/082 |
| 2019/0042943 A1* | 2/2019 | Dasgupta | G06N 7/005 |

* cited by examiner

*Primary Examiner* — Shane D Woolwine
(74) *Attorney, Agent, or Firm* — Amin, Turocy & Watson, LLP (57) ABSTRACT

A method for controlling a physical process includes receiving an input dataset corresponding to the physical process. The method further includes determining a data model based on the input dataset. The data model includes a plurality of latent space variables of a machine learning model. The method also includes receiving a plurality of reference models corresponding to a plurality of classes. Each of the plurality of reference models includes a corresponding plurality of latent space variables. The method includes comparing the data model with each of the plurality of reference models to generate a plurality of distance metric values. The method further includes selecting a reference model among the plurality of reference models based on the plurality of distance metric values. The method also includes controlling the physical process based on the selected reference model.

20 Claims, 5 Drawing Sheets

SYSTEM AND METHOD FOR CLASS SPECIFIC DEEP LEARNING

BACKGROUND

Embodiments of the present specification relate generally to deep learning, and more particularly to systems and methods for determining generative models for classification of medical datasets.

Input datasets are generated in many applications, such as, medical examination of subjects, monitoring operational status of a machine, or weather forecasting. Classification of input datasets is required for assessing or predicting an underlying physical process represented by the input datasets. In personalized medicine and population health management, accurate prediction of a trajectory of a disease is highly desirable to enable a clinician to customize individual's treatment. Predicting disease progression in an individual or specific response to therapy is a challenging problem as disease subtypes may have different manifestations outside of observed data. Longitudinal datasets generated by acquisition of input datasets corresponding to the same sample, during an extended period of time, are useful in predicting trajectory of a disease, an operational condition of a machine or in weather forecasting. Processing techniques having capability to handle missing data while maintaining consistency in assessment over the extended period of time are desirable for processing the longitudinal datasets.

Typically, deep learning techniques have proven successful in addressing problems involving sufficiently large, balanced and labeled datasets that appear in computer vision, speech and image processing. Deep neural networks combine feature representation learning and classifiers in a unified framework. However, tasks such as disease subtyping and staging offers a different set of challenges like limited data, class imbalance and diversity in samples. Learning feature representations in a discriminative setting may bias the model towards the more frequent classes and its features. Deep generative models like restricted Boltzmann machines and deep belief networks have the ability to learn stochastic and non-linear hierarchical features. However, the deep generative models cannot be trained effectively with limited training datasets and may not be able to model classes that have inherent imbalance.

BRIEF DESCRIPTION

In accordance with one aspect of the present specification, a method for controlling a physical process is disclosed. The method includes receiving an input dataset corresponding to the physical process. The input dataset is generated by at least one of a machine and an environmental condition. The method further includes determining a data model based on the input dataset. The data model includes a plurality of latent space variables of a machine learning model. The method also includes receiving a plurality of reference models corresponding to a plurality of classes. Each of the plurality of reference models includes a corresponding plurality of latent space variables. The method includes comparing the data model with each of the plurality of reference models to generate a plurality of distance metric values. The method further includes selecting a reference model among the plurality of reference models based on the plurality of distance metric values. The method also includes controlling the physical process based on the selected reference model.

In accordance with another aspect of the present specification, a system for controlling a physical process is disclosed. The system includes a data acquisition unit configured to acquire an input dataset corresponding to the physical process. The physical process includes at least one of a machine and an environmental condition. The system further includes a database unit communicatively coupled to the data acquisition unit and configured to store a plurality of reference models corresponding to a plurality of classes. Each of the plurality of reference models includes a corresponding plurality of latent space variables. The system also includes a model generation unit communicatively coupled to the database unit and configured to determine a data model based on the input dataset. The data model includes a plurality of latent space variables of a machine learning model. The system includes a controller unit communicatively coupled to the model generation unit and configured to compare the data model with each of the plurality of reference models to generate a plurality of distance metric values. The controller is further configured to select a reference model among the plurality of reference models based on the plurality of distance metric values. The controller is also configured to control the physical process based on the selected reference model.

In accordance with another aspect of the present specification, a non-transitory computer readable medium having instructions to enable at least one processor unit to control a physical process is disclosed. The instructions enable the at least one processor unit to receive an input dataset corresponding to the physical process. The input dataset is generated by at least one of a machine and an environmental condition. The instructions further enable at least one processor unit to determine a data model based on the input dataset. The data model includes a plurality of latent space variables of a machine learning model. The instructions also enable at least one processor unit to receive a plurality of reference models corresponding to a plurality of classes. Each of the plurality of reference models includes a corresponding plurality of latent space variables. The instructions enable at least one processor unit to compare the data model with each of the plurality of reference models to generate a plurality of distance metric values. The instructions further enable at least one processor unit to select a reference model among the plurality of reference models based on the plurality of distance metric values. The instructions also enable at least one processor unit to control the physical process based on the selected reference model.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

As will be described in detail hereinafter, systems and methods for deep learning based modelling is presented. More particularly systems and methods for determining generative models are presented which may be used for classification of medical datasets.

The term "physical process" refers to dynamics of a physical system such a machine, physiology of a subject, a chemical process or underlying dynamics of weather conditions. Non-limiting examples of the physical process includes weather dynamics, operational dynamics of a machine, a physiological process corresponding to a subject, a biological, or chemical process. The term "input dataset" refers to data generated by a physical process and acquired by one or more sensors or acquisition systems. Specifically, the input dataset may be in the form of a plurality of parameters, a plurality of images, or a combination thereof. The term "machine learning model" refers to a prototype, a set of equations or a simulation environment representative of a model of a physical process or data generated by a physical process. The machine learning model may include one or more of a deep learning network, such as, a convolutional neural network, a restricted Boltzmann machine, deep belief networks, and recurrent neural network. The term "latent space variable" refers to a parameter in a hidden layer of a neural network or a parameter in a vector space defined by a set of unobservable variables. The term "regenerative model" refers to a stochastic model characterized by a plurality of latent space variables. The term "class" refers to a subset of objects having a common property that is distinguishable from other objects. The term "longitudinal dataset" refers to data acquired at a plurality of time instants from a same source. For example, periodical scans acquired from a subject during a course of treatment constitute a longitudinal dataset.

Figure 1:
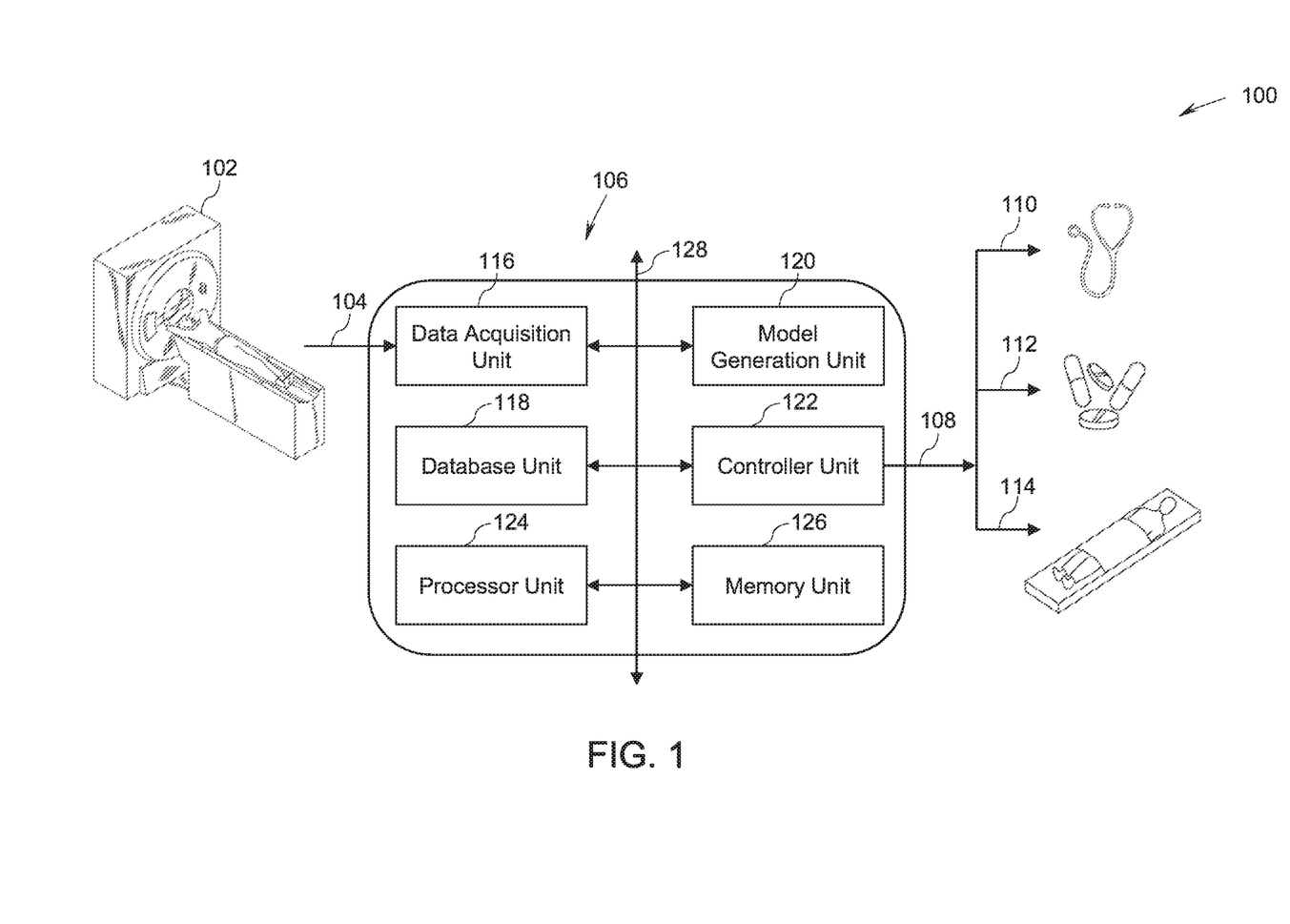
FIG. 1 is a diagrammatic illustration of a system using class specific generative models in accordance with an exemplary embodiment.

FIG. 1 is a diagrammatic illustration of a patient health monitoring system 100 using class specific generative models in accordance with an exemplary embodiment. In the illustrated embodiment, the patient health monitoring system 100 includes a data generator, such as an image acquisition subsystem 102. The image acquisition subsystem 102 includes a gantry and a patient table configured to acquire an input dataset 104 from a subject, such as a patient. In one embodiment, the image acquisition subsystem 102 may be a computed tomography (CT) system, a magnetic resonance imaging (MRI) system, a positron emission tomography (PET) system, or any other imaging system that is commonly used in healthcare facilities. The input dataset 104 may include image datasets such as, but not limited to, a plurality of two-dimensional (2D) images, a three-dimensional (3D) image dataset, a four-dimensional (4D) image dataset or a combination thereof. The image dataset may include information about a medical condition of the subject. The patient health monitoring system 100 further includes a modelling subsystem 106 configured to receive the input dataset 104 and configured to generate a recommendation 108 corresponding to the subject. The recommendation 108 may include a diagnosis of a medical condition, represented generally by reference numeral 110, a treatment schedule 112 or documentation and reporting 114. The recommendation 108 may suggest a plurality of treatment options and corresponding likely outcomes.

Although FIG. 1 is directed towards an imaging system configured to acquire data corresponding to one or more physiological processes occurring in a subject, the system 100 may also be configured to acquire data corresponding to a physical process. Non-limiting examples, of such systems that are configured to acquire data corresponding to a physical process include a weather condition analysis system, also referred to as "a weather prediction system," and a machine health assessment system. In an embodiment, where the system 100 is the weather condition analysis system, the input dataset 104 corresponds to a plurality of weather parameters measured over an extended period of time, such as months or seasons. Similarly, when the system 100 is the machine health assessment system, the input dataset 104 corresponds to a plurality of operational parameters of a machine, historical operational parameters of the machine, environmental parameters related to the machine. In case of the weather condition analysis and machine health assessment systems, the reference numeral 102 may represent one or more of the machine, a plurality of sensors, data loggers, and other such devices configured to sense a plurality of parameters that form the input dataset 104. In case of the weather condition analysis system, the recommendation 108 corresponds to a general weather prediction, specific weather conditions with estimates of weather parameters, an advice on precautions to be taken by government and non-government agencies, and combinations thereof. In case of the machine health assessment system, the recommendation 108 may include an end-of-life estimates for the machine, end-of-life estimates for one or more parts of the machine, estimates on health of the machine or one or more parts of the machine, or combinations thereof. The modelling subsystem 106 in the weather prediction system is configured to determine a machine learning model that provides a generative model representative of a weather condition. The modelling subsystem 106 in the machine health assessment system is configured to determine a machine learning model that provides a generative model representative of an operational model of a machine.

In one embodiment, the modelling subsystem 106 includes a data acquisition unit 116, a database unit 118, a model generation unit 120, a controller unit 122, a processor unit 124, and a memory unit 126, communicatively coupled to one another, for example via a communications bus. The data acquisition unit 116 is configured to acquire the input dataset 104 corresponding to a physical process. The data acquisition unit 116 includes signal processing circuitry, transceivers, and other communication equipment necessary to acquire the input dataset 104 from the physical process. Specifically, the data acquisition unit 116 is communicatively coupled with at least one of a keyboard, a mouse, and any other input device and configured to receive commands and/or parameters from an operator via a console.

The database unit 118 is communicatively coupled to the data acquisition unit 116 and configured to store a plurality of reference models corresponding to a plurality of classes. Each of the plurality of reference models is a regenerative model configured to classify the input dataset 104. Each of the plurality of reference models includes a corresponding plurality of latent space variables. The database unit 118 is also configured to store a plurality of historical input datasets having a plurality of pre-assigned labels. The term "historical input dataset" refers to an input dataset acquired previous time instants and stored in the memory unit 126. In one embodiment, the labels may correspond to the plurality of classes. Further, the labels may also represent diagnostic conditions, available treatment options, and suggested surgical interventions. In one embodiment, the database unit 118 may also include a plurality of parameters corresponding to a plurality of machine learning models.

The model generation unit 120 is communicatively coupled to the database unit 118 and configured to determine a data model based on the input dataset 104. The data model includes a plurality of latent space variables. It may be noted herein that the data model is representative of a regenerative model. Specifically, in one embodiment, the model generation unit 120 is configured to generate the data model based on the input dataset 104 using a machine learning technique. In such an embodiment, the data model is a machine learning model. A thresholding technique is used to generate a training dataset based on the input dataset 104. In one non-limiting example, 24 thresholds may be used to generate the training dataset. In another non-limiting example, 50 thresholds are used to generate the training dataset. In one embodiment, a restricted Boltzmann machine (RBM) is used as the machine learning model. The RBM includes an exponential distribution as a function of an energy function variable. The energy model is a function of a set of visible variables and latent variables. When the visible variables and the latent variables are binary variables, a closed form expression for the energy function and a convex cost function are available. A least square minimization technique may be employed to minimize the convex cost function and determine the RBM model.

Similarly, the model generation unit 120 is also configured to generate a plurality of reference models corresponding to a plurality of classes based on historical input datasets. The plurality of classes may be defined by a user or determined based on the classification requirements corresponding to the physical or physiological processes. A plurality of subjects (specified by a variable N) may be considered for a training reference model in each class and binarization of input datasets may be performed by selection of a plurality of threshold values (specified by a variable M). In one embodiment, data from 40 subjects may be considered for generating two classes. In one example, out of these 40 subjects, 15 subjects may form a first class and the remaining 25 subjects may form a second class. A first reference model is determined based on data from the 15 subjects of the first class. A second reference model may be determined based on data from 25 subjects belonging to the second class. An input model is determined based on input dataset 104 from the subject under examination. It may be noted that data from a single subject is used for generating the input model. Data used for generating the plurality of reference models and the data model may be converted to a binary form using a plurality of thresholds. In one embodiment, the 24 thresholds are used to binarize data from each subject. A RBM model with a learning rate of 0.01, batch size of 5, having 2 hidden units, and 20 epochs is used to build machine learning models that generate the plurality of latent space variables.

The controller unit 122 is communicatively coupled to the model generation unit 120 and configured to compare the data model with each of the plurality of reference models to generate a plurality of distance metric values. The controller unit 122 is further configured to select a reference model among the plurality of reference models based on the plurality of distance metric values. The selected reference model is nearest to the data model among the plurality of reference models when a minimum distance metric value is chosen among the plurality of distance metric values. The controller unit 122 is also configured to control the physical process based on the selected reference model.

The processor unit 124 includes at least one of a general-purpose computer, a graphics processing unit (GPU), a digital signal processor, and a controller. In some embodiments, the processor unit 124 includes a customized processor element such as, but not limited to, an application-specific integrated circuit (ASIC) and a field-programmable gate array (FPGA). In some embodiments, the processor unit 124 may perform one or more functions of at least one of the data acquisition unit 116, the model generation unit 120, and the controller unit 122. The processor unit 124 may include more than one processors co-operatively working with each other for performing intended functionalities. The processor unit 124 is further configured to store (retrieve) contents in (from) the memory unit 126. In one embodiment, the processor unit 124 is configured to initiate and control functionalities of one or more of the data acquisition unit 116, the model generation unit 120, and the controller unit 122.

In some embodiments, one or more units 116-126 of the modelling subsystem 106, may perform functions of one or more other units 116-126. In these embodiments, one or more of the units 116-126 may be combined to form a single unit. For example, in certain embodiments, the processor unit 124 is configured to perform the functionality of the data acquisition unit 116. In some embodiments, the processor unit 124 is configured to perform the functionality of the model generation unit 120. By way of example, the processor unit 124 may be configured to retrieve the contents of the database unit 118 and build the plurality of reference models from the historical input datasets. Further, the processor unit 124 is also configured to build the input model based on the input dataset 104.

In some embodiments, the memory unit 126 is a random-access memory (RAM), read only memory (ROM), flash memory, or any other type of computer readable memory accessible by at least one of the data acquisition unit 116, the model generation unit 120, and the controller unit 122. Also, in certain embodiments, the memory unit 126 may be a non-transitory computer readable medium encoded with a program having a plurality of instructions to instruct at least one of the data acquisition unit 116, the model generation unit 120, and the controller unit 122 to perform a sequence of steps to generate the recommendation 108. Specifically, the program may instruct the data acquisition unit 116 to acquire the input dataset 104, the model generation unit 120 to generate a data model based on the input dataset 104, the database unit 118 to provide a plurality of reference models, and a controller unit 122 to generate a recommendation based on the plurality of reference models and the data model.

Figure 2:
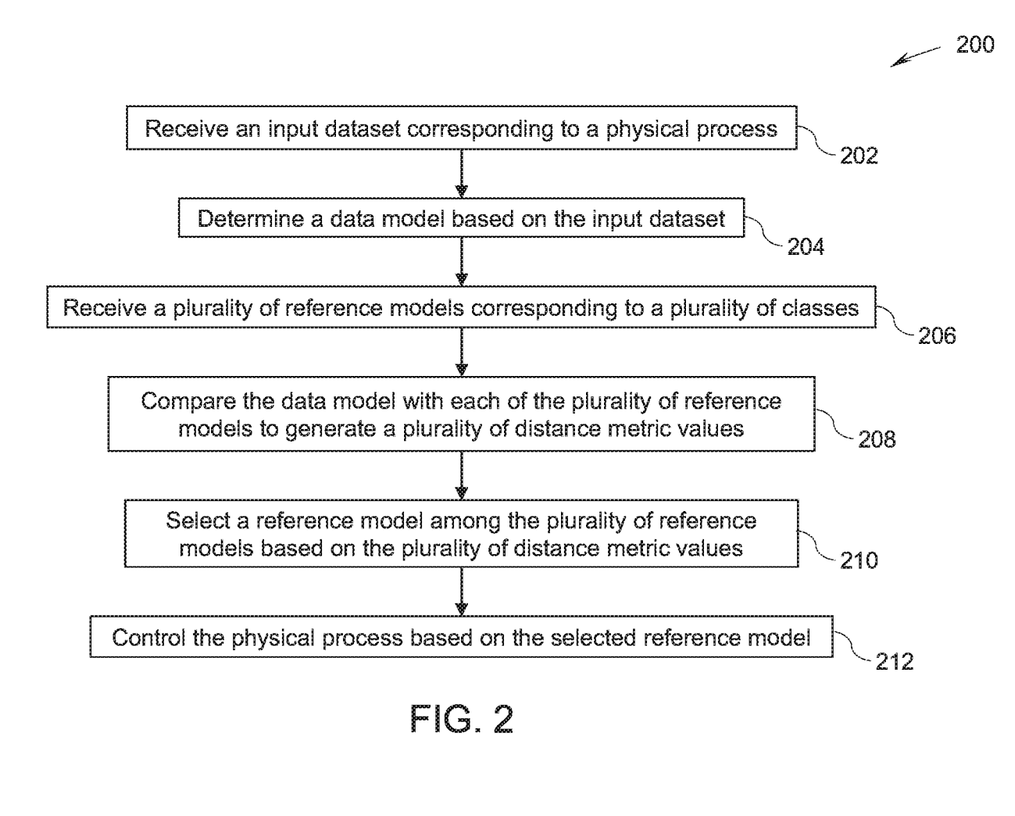
FIG. 2 is a flow chart of a method for generating class specific generative models in accordance with an exemplary embodiment.

FIG. 2 is a flow chart of a method 200 for generating class specific generative models in accordance with an exemplary embodiment. The method 200 includes receiving an input dataset corresponding to a physical process at step 202. The input dataset is received, for example by the data acquisition unit 116 of FIG. 1. The input dataset is generated by at least one of a machine, a subject and an environmental condition. In one embodiment of step 202, at least one of a MRI dataset, a CT imaging dataset, and a PET dataset is acquired as the input dataset. The input dataset may correspond to a longitudinal dataset having multiple image data sets from the same subject over an extended period of several months during periodical examinations. The multiple image datasets may be indexed with respect to different time instants representing respective time instants of data acquisition.

The method 200 also includes at step 204, determining a data model based on the input dataset. The data model comprises a plurality of latent space variables of a machine learning model. In one embodiment, the machine learning model includes a restricted Boltzmann machine network. The data model is determined by the model generation unit 120 of FIG. 1.

At step 206, a plurality of reference models is received in the method 200. In one embodiment, the plurality of reference models is generated by the model generation unit 120 of FIG. 1. The plurality of reference models corresponds to a plurality of classes. Each of the plurality of reference models includes a corresponding plurality of latent space variables. In one embodiment, the step 206 also includes training a plurality of deep learning networks based on a plurality of training datasets corresponding to the plurality of classes. Each of the plurality of training datasets may be generated based on historical input datasets corresponding to each class category identified apriori. The plurality of deep learning networks may be applied to the corresponding input datasets to generate the plurality of reference models. In one embodiment, the plurality of reference models may be adapted by adapting the plurality of deep learning networks and reapplying the plurality of adapted deep learning networks to the corresponding training input datasets. A suitable learning technique may be used to adapt the deep learning networks.

In one embodiment, the step 206 also includes generating the plurality of reference models specifically for the longitudinal datasets. Specifically, the step 206 includes receiving a longitudinal dataset from a historical database and establishing an association between the longitudinal dataset and a plurality of expected reference model outputs corresponding to a longitudinal time stamp value. Further, the step 206 also includes training a plurality of machine learning networks for a longitudinal time stamp value based on the corresponding longitudinal dataset. The machine learning networks includes neural network based machine learning models. In one embodiment, the plurality of reference models includes a RBM network.

At step 208, the method 200 also includes comparing the data model, by the controller unit 122, with each of the plurality of reference models to generate a plurality of distance metric values. The distance metric values may include, but are not limited to, an absolute difference between the data model parameters and the reference model parameters, a least square value between the data model parameters and the reference model parameters.

A reference model is selected at step 210 among the plurality of reference models based on the plurality of distance metric values. In one embodiment, a reference model having a least distance metric value among the plurality of distance metric values is selected.

The method 200 also includes controlling the physical process based on the selected reference model in step 212. It may be noted that the selected reference model also includes recommendations such as, but not limited to, a treatment plan, a surgical treatment suggestion or a diagnosis of an underlying medical condition of the subject. The step 212 further includes combining one or more of the recommendation with other attributes of the subject or the input dataset to generate case specific medical recommendations. When a physiological process is considered, controlling step of 212 includes treating the subject based on recommendations corresponding to the selected reference model. The steps 210, 212 are also performed by the controller unit 122 of FIG. 1.

Figure 3:
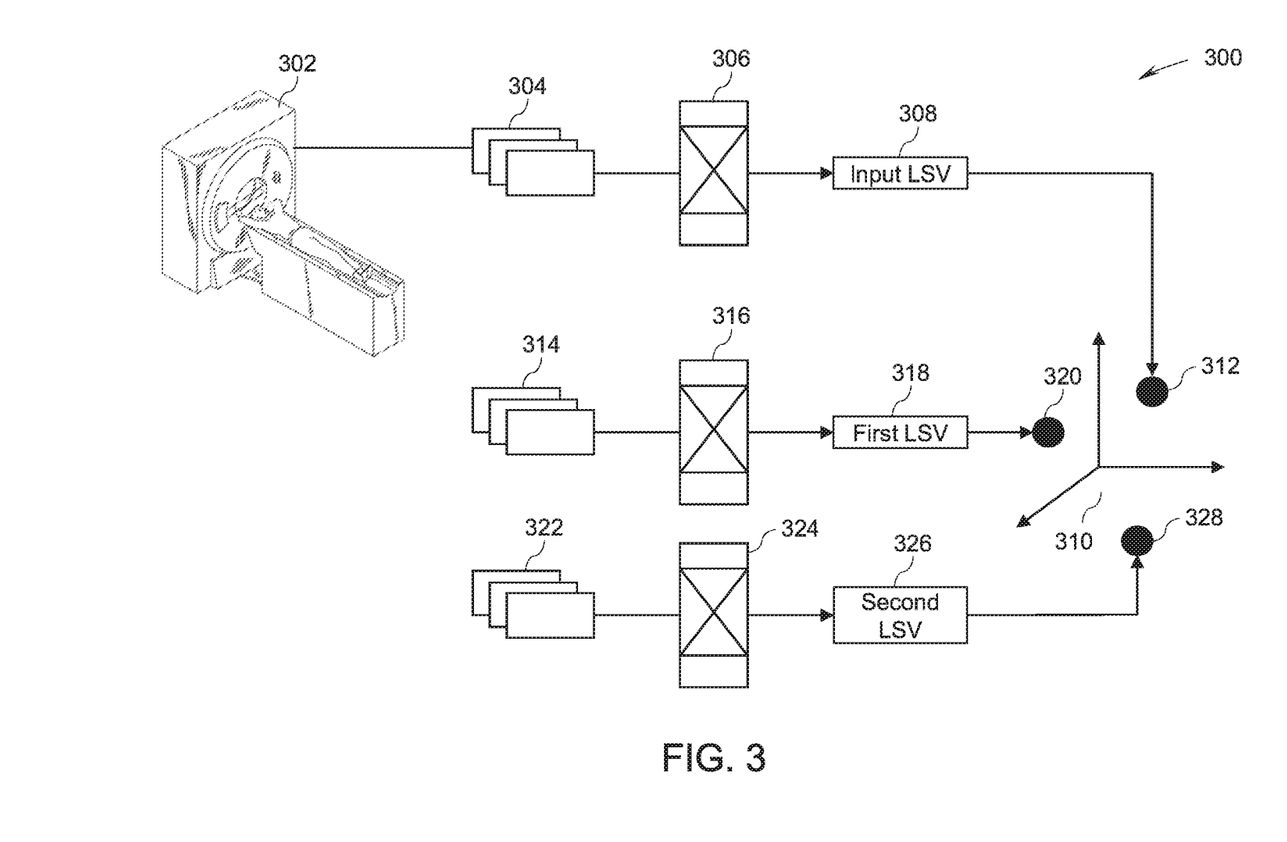
FIG. 3 is a schematic diagram illustrating classification of an input dataset using class specific generative models in accordance with an exemplary embodiment.

FIG. 3 is a schematic 300 illustrating classification of an input dataset using class specific generative models in accordance with an exemplary embodiment. The classifications of the input dataset are performed by the controller unit 122 of FIG. 1. The classification scheme of FIG. 3 is explained with respect to a physiological process, however, the classification scheme of FIG. 3 may also be applied to other types of physical processes. By way of example, the classification scheme of FIG. 3 may be used by the weather forecasting system or the machine health assessment system. To that end, the schematic 300 includes a data generator 302 that generates an input dataset 104 of FIG. 1 corresponding to the physical process. As stated previously, when a physiological process is considered, the data generator 302 may correspond to an image acquisition subsystem 102. In another embodiment, when a physical process other than a physiological process is considered, the data generator 302 may correspond to a plurality of sensors acquiring environmental parameters and/or operational parameters of a machine, an environment, or both. The schematic 300 also includes an input feature parameter dataset 304 extracted from the input dataset 104 generated from the data acquisition unit 116. The input feature parameter dataset 304 is representative of a plurality of features required by the neural network 306. The input feature parameter dataset 304 is processed by a neural network 306 to generate the plurality of latent space variables corresponding to the input dataset 104. The plurality of latent space variables corresponding to the input dataset 104 is representative of an input specific latent space representation 308. The input specific latent space representation 308 includes a plurality of latent space variables of the data model. The input specific latent space representation 308 is a multi-dimensional vector generally represented geometrically in a multi-dimensional co-ordinate space 310 by a circle 312. The schematic 300 also includes a plurality of class specific feature datasets 314, 322 corresponding to a plurality of classes. In one example, the plurality of classes is representative of a plurality of health conditions. The class specific feature datasets facilitate categorizing the input dataset into a specific group.

By way of example, in an embodiment, where a physiological process is considered, subjects belonging to a specific class among the plurality of classes are identified. Each class is represented by class specific features. Further, the plurality of class specific feature datasets 314, 322 are generated based on image datasets corresponding to subjects. The plurality of subjects belonging to a specific class is identified apriori and the image datasets corresponding to them are labelled appropriately. In the schematic 300 two classes are considered. The feature dataset 314 corresponds to a first class, and the feature dataset 322 corresponds to a second class. The feature dataset 314 is generated based on a first plurality of subjects. Similarly, the feature dataset 322 is generated based on a second plurality of subjects. The first and second plurality of subjects may have common subjects when both the first feature dataset and the second feature dataset are available for the common subjects. The feature dataset 314 is processed by a first neural network 316 to generate a first latent space representation 318. The feature dataset 322 is processed by a second neural network 324 to generate a second latent space representation 326. The first latent space representation 318 and the second latent space representation 326 are also multi-dimensional vectors having the same dimension as that of the input specific latent space representation 308. The first latent space representation 318 is represented geometrically by a circle 320 and the second latent space representation 326 is represented geometrically by a circle 328 in the multi-dimensional co-ordinate space 310. A geometrical distance between the circles 312 and 320 representing the latent space variables and the first latent space representation 318, respectively, is referred to as a first geometric distance. A geometrical distance between the circles 312 and 328 representing the input specific latent space representation 308 and the second latent space representation 326, respectively, is referred to as a second geometric distance. The first and second geometrical distances are computed based on the input specific latent space representation 308, the input specific latent space representation 308, the first latent space representation 318 and the second latent space representation 326. The first and second geometrical distances are compared with one another. If the first geometrical distance has a lower value than the second geometrical distance, the input dataset 104 is classified as belonging to first class. Alternatively, if the first geometrical distance has a greater value than the second geometrical distance, the input dataset 104 is classified as belonging to the second class.

In addition to the feature datasets 314, 322, the first class and the second class further include a plurality of labels representative of diagnosis of a disease, suggestions for surgical options, drug therapy, and other such aspects. The recommendation about the input dataset 104 is generated based on one or more labels from the plurality of labels.

Figure 4:
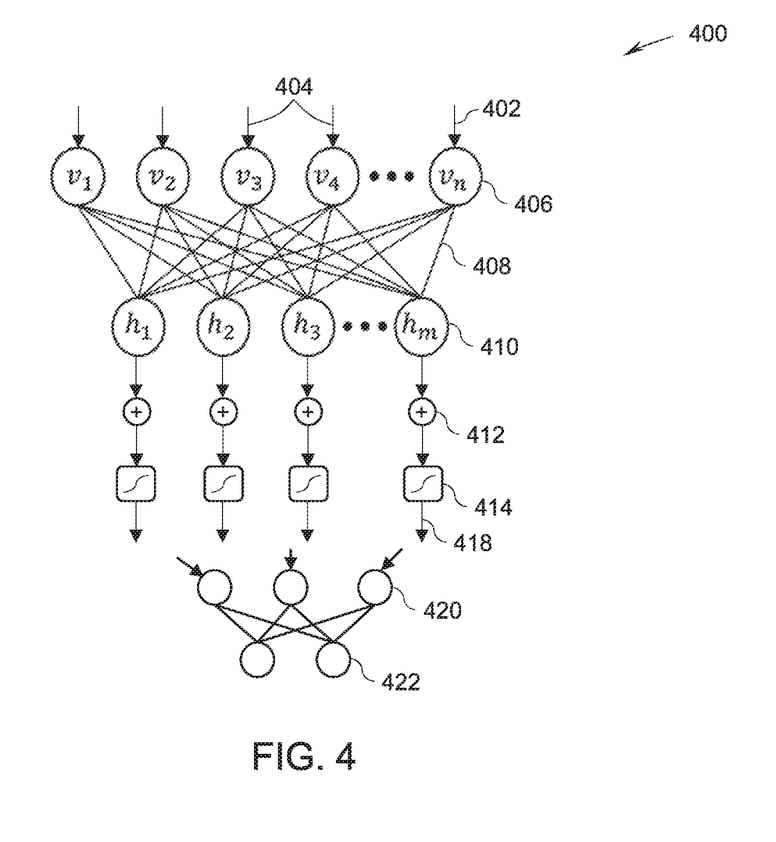
FIG. 4 is a schematic of a restricted Boltzmann machine used to generate a generative model in accordance with an exemplary embodiment.

FIG. 4 is a schematic 400 of a restricted Boltzmann machine (RBM) used to create a generative model in accordance with an exemplary embodiment. The schematic 400 includes an input data set 402 with a plurality of input data samples 404 provided to a visible layer 406 having a plurality of nodes. In the illustrated embodiment, four nodes are considered in the visible layer 406. When a physiological process is considered, the nodes of the visible layer 406 represent pixels of an image of input dataset 104. When the image size is 128×64, the number of nodes in the visible layer 406 is 8192. The input nodes of the visible layer 406 are weighed by a plurality of weights 408 and are combined at the hidden layer 410. The restricted Boltzmann machine is constrained not to have communication between nodes within the visible layer 406. Similarly, there is no communication among the nodes of the hidden layer 410. The output of the hidden layer 410 is biased by a bias factor 412 and processed by an activation function 414 to generate an output data 418. The schematic 400 also illustrates additional one or more hidden layers 422 with a corresponding plurality of weights 420. The restricted Boltzmann machine of FIG. 4 may be cascaded to derive a deep learning belief network. The restricted Boltzmann machine is trained by maximizing the marginal probability of a visible input node variables with respect to the weights.

Figure 5:
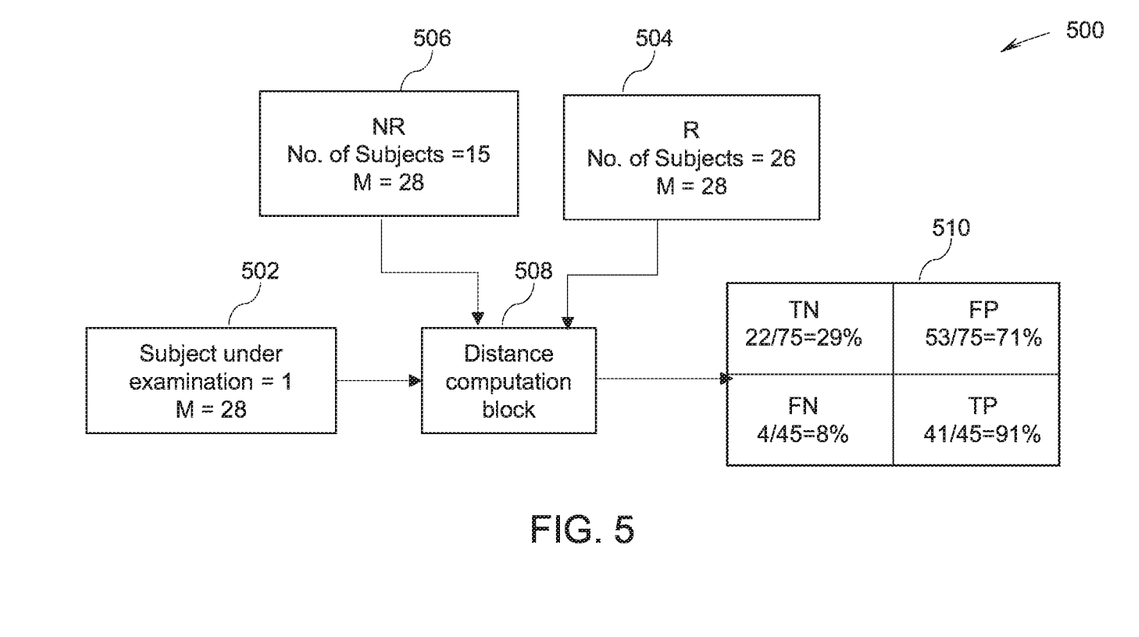
FIG. 5 is schematic representation illustrating details of a case study of using class specific generative models in accordance with an exemplary embodiment.

FIG. 5 is schematic 500 illustrating details of a case study of using class specific generative models in accordance with an exemplary embodiment. The schematic 500 corresponds to a case study related to mild traumatic brain injury (mTBI). In the case study, the generative models disclosed herein are used to predict mTBI recovery one month post injury. The generative model includes class specific models for recovered (represented by letter R) class and not recovered (represented by letters NR) class of mTBI patients. The case study includes 41 patients having mTBI with 26 patients exhibiting recovery and 15 patients not showing recovery. A first class 504 includes data from 26 patients who have recovered from mTBI after one month. A second class 506 includes data from 15 patients who have not recovered from mTBI after one month. Data from a new patient is considered in patient data 502 representative of a test sample. Patient data in the case study refers to resting state functional MRI (rs-fmri) image datasets. The rs-fmri data is represented as binary data using thresholding with 28 thresholds. The binary data is used to generate a first generative model corresponding to the R class and a second generative model corresponding to the NR class. An RBM having 2 hidden units is trained for each of the classes with a batch size of 5 and a learning rate of 0.01. The training is performed by considering 20 epochs. Validation of the training of RBM is performed based on leave-n-out cross validation format. In the first class, data from three subjects is used for validating the first generative model and data from five subjects is used to validate the second generative model. The patient data 502 includes rs-fmri data from a new patient and a thresholding with 28 thresholds is performed to generate the input data. A test generative model corresponding to the new patient is generated by training an RBM with same meta parameters used to generate class specific first generative model and the second generative model. A first distance value between the test generative model and the first generative model, and a second distance value between the test generative model and the second generative model is computed at a distance computation block 508. The new patient is included in one of the two classes based on the first distance value and the second distance value. About 120 new patients are evaluated in this manner and the classification results are compared with actual recovery data to generate confusion matrix.

The performance of the generative models to predict the recovery from mTBI is illustrated in a table 510. About 41 subjects out of 45 recovered patients (about 91%) are predicted correctly. Similarly, only four subjects out of 45 subjects (about 4%) are incorrectly predicted as not recovering. In the table 510, the correct prediction statistic is represented as TP (true positive) and incorrect prediction statistic is represented as FN (false negative). The table also provides false positive (FP) and true negative (TN) statistics as 71% and 29% respectively. The proposed generative model technique is able to achieve a high sensitivity (true positive) of 91%. Although, the specificity (true negative) is low at 29%, with availability of additional data, this indicator is expected to increase. Further, latent space variables of the class specific regenerative models may be mapped to regions in the brain. The difference between the latent space variables of the first regenerative model and the second regenerative model is indicative of the regions contributing to differentiation of two classes.

Embodiments of class specific generative models characterize class-specific features enabling efficient binary classification. Disclosed technique is amenable to better pattern interpretation based on stable brain connectivity patterns representative of discriminative changes in brain function between the groups. The class specific generative modelling using latent space variables may be used to process longitudinal data without additional computations. In the medical context, the disclosed technique enables classification of patients as responder and non-responders to predict therapy outcome which is critical for treatment decisions and drug development.

It is to be understood that not necessarily all such objects or advantages described above may be achieved in accordance with any particular embodiment. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While the technology has been described in detail in connection with only a limited number of embodiments, it should be readily understood that the specification is not limited to such disclosed embodiments. Rather, the technology can be modified to incorporate any number of variations, alterations, substitutions or equivalent arrangements not heretofore described, but which are commensurate with the spirit and scope of the claims. Additionally, while various embodiments of the technology have been described, it is to be understood that aspects of the specification may include only some of the described embodiments. Accordingly, the specification is not to be seen as limited by the foregoing description, but is only limited by the scope of the appended claims.

The invention claimed is:

1. A computer-implemented method, comprising:
receiving, by a system comprising a processor, an input dataset corresponding to a medical condition of a subject, wherein the input dataset is generated by at least one of a machine;
generating, by the system, a data model based on the input dataset, wherein the data model comprises a plurality of latent space variables of a machine learning model;
accessing, by the system, a plurality of reference models corresponding to a plurality of classes of the medical condition, wherein each of the plurality of reference models comprises a corresponding plurality of latent space variables of a corresponding version of the machine learning model;
comparing, by the system, the data model with each of the plurality of reference models to generate a plurality of distance metric values;
selecting, by the system, a reference model among the plurality of reference models based on the plurality of distance metric values; and
classifying, by the system, the medical condition of the subject with one of the plurality of classes based on the one of the plurality of classes corresponding to the reference model.

2. The method of claim 1, wherein the machine learning model comprises a restricted Boltzmann machine network.

3. The method of claim 1, wherein the input dataset comprises at least one of a magnetic resonance imaging dataset, a computer tomography imaging dataset and a positron emission tomography dataset.

4. The method of claim 1, wherein the input dataset comprises a longitudinal dataset corresponding to the medical condition of the patient over a period of time.

5. The method of claim 1, further comprising:
training, by the system, the plurality of reference models based on a respective training datasets corresponding to the plurality of classes.

6. The method of claim 5, wherein the machine learning model comprises a deep learning network and wherein the training further comprises adapting, by the system, the plurality of reference models based on a learning technique.

7. The method of claim 5, further comprising:
receiving, by the system, a longitudinal dataset from a historical database;
establishing, by the system, an association between the longitudinal dataset and a plurality of expected model outputs corresponding to a longitudinal time stamp value; and
training, by the system, a plurality of machine learning networks corresponding to the longitudinal time stamp value based on the longitudinal dataset.

8. The method of claim 1, further comprising:
facilitating controlling, by the system, the medical condition of the subject based on the classifying.

9. The method of claim 1, further comprising: facilitating treating, by the system, the subject based on one or more recommendations corresponding to the one of the plurality of classes.

10. The method of claim 1, wherein the selecting comprises selecting the reference model based on the reference model being associated with a lowest distance metric value of the plurality of distance metric values.

11. A system, comprising:
a data acquisition unit that acquires an input dataset corresponding to a medical condition of a subject, wherein the input dataset is generated by at least one of a machine;
a database unit communicatively coupled to the data acquisition unit that stores a plurality of reference models corresponding to a plurality of classes of the medical condition, wherein each of the plurality of reference models comprises a corresponding plurality of latent space variables of corresponding versions of a machine learning model;
a model generation unit communicatively coupled to the database unit that generates a new data model based on the input dataset, wherein the new data model comprises a plurality of latent space variables of a new version of the machine learning model;
a controller unit communicatively coupled to the model generation unit that:
compares the new data model with each of the plurality of reference models to generate a plurality of distance metric values;
selects a reference model among the plurality of reference models based on the plurality of distance metric values; and
classifies the medical condition of the subject with one of the plurality of classes based on the one of the plurality of classes corresponding to the reference model.

12. The system of claim 11, wherein the machine learning model comprises a restricted Boltzmann machine network.

13. The system of claim 11, wherein the input dataset comprises at least one of a magnetic resonance imaging dataset, a computer tomography imaging dataset and a positron emission tomography dataset.

14. The system of claim 11, wherein the input dataset comprises a longitudinal dataset corresponding to the medical condition of the patient over a period of time.

15. The system of claim 11, wherein the model generation unit further trains the plurality of reference models based on a respective training datasets corresponding to the plurality of classes.

16. The system of claim 15, wherein the machine learning model comprises a deep learning network and wherein the model generation unit trains the plurality of reference models by adapting the plurality of reference models based on a learning technique.

17. The system of claim 15, wherein the model generation unit is further:
receives a longitudinal dataset from a historical database;
establishes an association between the longitudinal dataset and a plurality of expected model outputs corresponding to a longitudinal time stamp value; and
trains a plurality of machine learning networks corresponding to the longitudinal time stamp value based on the longitudinal dataset.

18. The system of claim 11, wherein the controller unit further controls the medical condition of the subject based on the one of the plurality of classes.

19. The system of claim 11, wherein the controller unit further treats the subject based on one or more recommendations corresponding to the one of the plurality of classes.

20. The method of claim 1, wherein the comparing comprises comparing the plurality of latent space variable with each of the corresponding plurality of latent space variables to generate the plurality of distance metric values.

* * * * *